United States Patent [19]

Takahashi et al.

[11] Patent Number: 5,296,677
[45] Date of Patent: Mar. 22, 1994

[54] FILLER METAL FOR WELDING SINTERED MATERIALS

[75] Inventors: Eiji Takahashi; Yasuo Murai; Hironori Suzuki, all of Fujisawa, Japan

[73] Assignee: Kobe Steel, Ltd., Kobe, Japan

[21] Appl. No.: 841,550

[22] Filed: Feb. 26, 1992

[30] Foreign Application Priority Data

Feb. 26, 1991 [JP] Japan ............................. 3-056198
Mar. 13, 1991 [JP] Japan ............................. 3-074136
Apr. 12, 1991 [JP] Japan ............................. 3-108741

[51] Int. Cl.$^5$ ............................................. B23K 35/34
[52] U.S. Cl. ........................... 219/146.41; 219/146.23
[58] Field of Search ............... 420/72, 73, 75; 75/255, 75/246, 252; 219/146.23, 146.41

[56] References Cited

U.S. PATENT DOCUMENTS 2,156,299  5/1939  Leitner .
3,716,347  2/1973  Bergstrom et al. .

FOREIGN PATENT DOCUMENTS 4625971   7/1971   Japan ................................... 420/73
55-145154 11/1980  Japan ................................... 420/75
480545    2/1938   United Kingdom ................. 420/73
1076285   7/1967   United Kingdom .
1332241  10/1973   United Kingdom ................. 420/73

OTHER PUBLICATIONS

Patent Abstracts of Japan, vol. 12, No. 91 (M-679) (2938), Mar. 24, 1988, & JP-A-62-230-496, K. Ogawa, Oct. 9, 1987, "Welding Material for Sintered Two-Phase Stainless Steel".

Patent Abstracts of Japan, vol. 8, No. 230 (M-333), Oct. 23, 1984, & JP-A-59-110-481, S. Katsurada, "Welding Method of Sintered Metallic Material".

Primary Examiner—Deborah Yee
Attorney, Agent, or Firm—Oblon, Spivak, McClelland, Maier & Neustadt

[57] ABSTRACT

Disclosed herein is a filler metal for joining (mainly by high energy density beam welding) a part of porous sintered material to a part of the same material or steel, which gives rise to a weld zone free of such defects as cold cracking and blowholes.

The filler metal contains, by weight, at least one selected from the group consisting of Cr, Mo, and Si and at least one selected from the group consisting of Ni, C, and Mn in an amount specified by the equations below $$Y \geq -(\tfrac{1}{3})X + 23 \text{ and } Y \geq 12$$

where
  $X = Cr(\%) + Mo(\%) + 1.5\ Si(\%)$
  $Y = 1.2\ Ni(\%) + 20\ C(\%) + 0.8\ Mn(\%)$ and at least one selected from the group consisting of Al, Ti, Zr, and V in a total amount of 0.3–5%, with the balance being Fe and inevitable impurities. The filler metal may be in the form of solid wire or cored wire. The filler metal for arc welding has a composition defined by $Y \geq -(\tfrac{1}{3})X + 18$ and $Y \geq 7$.

4 Claims, 4 Drawing Sheets

FILLER METAL FOR WELDING SINTERED MATERIALS

BACKGROUND OF THE INVENTION

1. Field of the Invention

The present invention relates to a filler metal to be used for welding a part of porous sintered material to a part of the same material or steel in the assembling of automotive transmission systems.

2. Description of the Prior Art

The joining of steel to steel is accomplished mostly by arc welding or high energy density beam welding (such as electron beam welding and laser beam welding) These welding techniques, however, cannot be applied to sintered materials, because sintered materials contain pores, which, during welding, form large blowholes in the weld metal, resulting in insufficient weld strength There have been proposed several methods for joining sintered materials but they suffer from their respective disadvantages as follows.

(1) Joining by brazing

This involves difficulties in selecting brazing filler metals and establishing adequate brazing conditions and also presents problems associated with the wettability of brazing filler metal. With excess wettability, the brazing filler metal is absorbed by pores of base materials, resulting in a shortage of brazing filler metal on the joint interface. With poor wettability, the brazing filler metal does not achieve good joining of sintered materials, particularly those of medium and high carbon contents. In addition, brazing tends to grow pores near the joint interface, which is detrimental to uniform strength.

(2) Joining by shrinkage fit or expansion fit

This is accomplished during or after sintering by utilizing the difference of two parts in their coefficient of linear expansion. A joint by this method tends to lose its strength with time in some environment.

(3) Joining by infiltration

This joining method is by melting an infiltration material (such as copper) placed between two parts, thereby filling it into pores in the joint surface. Since the bond strength depends on the infiltration material, the joint strength is much lower than that of the base material. Fundamentally, this method cannot be applied to the joining of a part of steel to a part of sintered material.

(4) Joining by high energy density beam welding after infiltration

This joining method is disclosed in Japanese Patent Laid-open No. 160185/1990. According to this method, the beam welding is performed after the filling of pores with an infiltration material, which prevents the occurrence of blowholes. However, the beam welding with rapid cooling brings about transformation cracking and cold cracking when applied to sintered materials incorporated with 0.4–1% carbon for reinforcement. In addition, the infiltration material, which is usually copper, increases the copper content in the weld metal. This copper in conjunction with sulfur originating from the base metal makes the weld metal highly susceptible to hot cracking. Consisting of two steps of infiltration and beam welding, this method is poor in productivity.

(5) Joining by high energy density beam welding which employs a high-manganese filler material This joining method was proposed by the present inventors. It is by high energy density beam welding which employs a high-manganese filler material incorporated with aluminum and titanium. It is free of all the shortcomings involved in the joining of sintered materials. The only one problem is that the weld metal is hard and poor in toughness because it is composed of Fe, C, and Mn.

As mentioned above, the conventional joining method and filler material are liable to give rise to several defects and poor in productivity and they do not provide sufficient joint strength and toughness. At present, there are no joining methods and filler materials which meet all the requirements.

If the above-mentioned high energy density beam welding can be applied to the joining of a part of porous sintered material to a part of the same material or steel, it would be advantageous in penetration depth, productivity, and strain. Unfortunately, defects such as cold cracking due to carbon and blowholes due to pores are inevitable in the joining of sintered materials, because sintered materials are porous and usually contain a considerable amount of carbon. (Small hot cracks are permissible, but large ones should be avoided.) For the beam welding to be of practical use in the field where high productivity is important, it is necessary that it does not give rise to cold cracking and blowholes but invariably provides joints of adequate strength.

SUMMARY OF THE INVENTION

The present invention was completed to meet the foregoing requirements. Accordingly, it is an object of the present invention to provide a filler metal (wire) to be used for the joining of sintered materials by high energy density beam welding. The filler metal does not give rise to defects such as cold cracking and blowholes in the joining of sintered materials.

To address the foregoing problems, the present inventors carried out a series of researches, which led to the finding that the problems can be solved if the composition of the filler metal is adequately controlled. The present invention is based on this finding.

The present invention is embodied in a filler metal to be used for welding a part of porous sintered material to a part of the same material or steel, the filler metal containing, by weight (the same shall apply hereinafter), at least one selected from the group consisting of Cr, Mo and Si, and at least one selected from the group consisting of Ni, C and Mn, in an amount specified by the equations below $$Y \geq -(\tfrac{1}{3})X + 23 \text{ and } Y \geq 12$$

where $X = Cr(\%) + Mo(\%) + 1.5\,Si(\%)$, and $Y = 1.2\,Ni(\%) + 20\,C(\%) + 0.8\,Mn(\%)$, and further at least one selected from the group consisting of Al, Ti, Zr and V in a total amount of 0.2–5%, with the balance being Fe and inevitable impurities.

The present invention is also embodied in a filler metal containing 0.05–1% C, 15–30% Mn, and at least one selected from the group consisting of Al and Ti in a total amount of 0.2–3%, and optionally one or more selected from the group consisting of 2% or less Si, 1% or less Cu, 10% or less Ni, 4% or less Cr, and 2% or less Mo.

The present invention is also embodied in a filler metal in the form of cored wire composed of a stainless steel sheath and metal powder enclosed therein, which is characterized in that the metal powder contains (based on the total weight of the wire) 5–30% Mn and optionally 0.05–1% C and at least one selected from the group consisting of Al and Ti in a total amount of 0.2–3%.

The present invention is also embodied in a filler metal in the form of solid wire which contains 0.05–1% C, 2% or less Si, 5–30% Mn, 7–15% Ni, 20% or less Cr, and at least one selected from the group consisting of Al and Ti in a total amount of 0.2–3%, with the balance being Fe and inevitable impurities.

The present invention is also embodied in a filler metal to be used for arc welding a part of porous sintered material to a part of the same material or steel, the filler metal containing, at least one selected from the group consisting of Cr, Mo and Si, and at least one selected from the group consisting of Ni, C, and Mn in an amount specified by the equations below $Y \geq -(\frac{1}{3})X + 18$ and $Y \geq 7$ where $X = Cr(\%) + Mo(\%) + 1.5\, Si(\%)$, and
$Y = 1.2\, Ni(\%) + 20\, C(\%) + 0.8\, Mn(\%)$ and further at least one selected from the group consisting of Al, Ti, Zr, and V in a total amount of 0.2–5%, with the balance being Fe and inevitable impurities.

DESCRIPTION OF THE PREFERRED EMBODIMENTS

Figure 1:
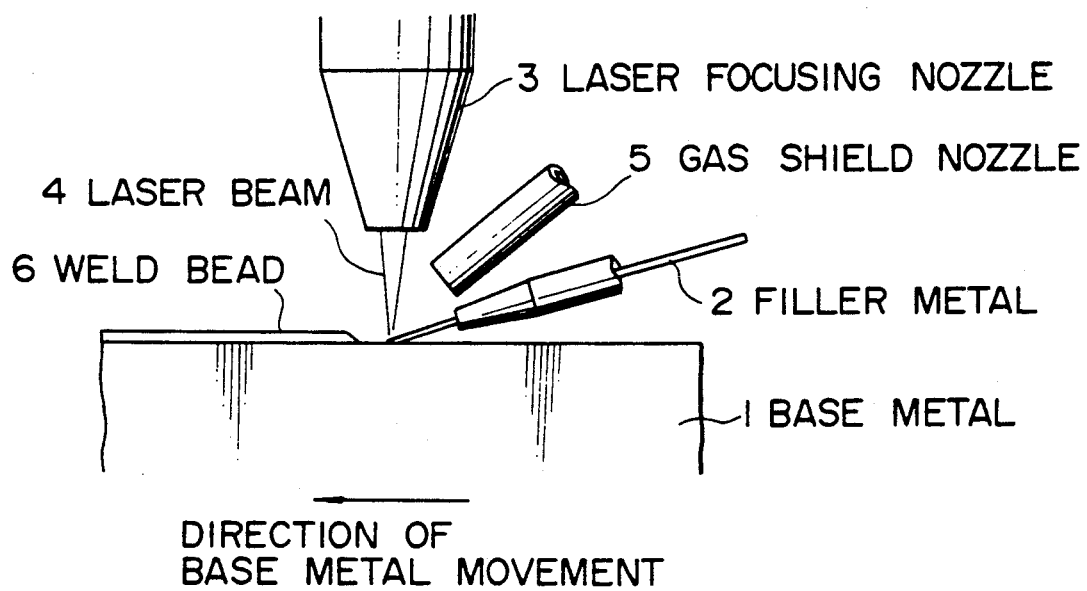
FIG. 1 is a schematic illustration showing the operation of laser welding.

The invention will be explained in more detail in the following.

The high energy density beam welding applied to the joining of sintered materials poses problems associated with blowholes (resulting from pores in the base material), cold cracking, hot cracking, and transformation cracking, as mentioned above, because machine parts of sintered materials are produced from pure iron powder or alloy powder incorporated with 0.4–1% carbon (for improved strength), 2.5% or less copper (as a sintering aid), and a binder. These problems are solved by using the filler metal of the present invention which functions as follows:

The filler metal prevents cold cracking, which occurs when the weld metal undergoes martensitic transformation, by supplying a specific component which inhibits martensitic transformation but forms austenite or a mixture of austenite and martensite in the weld metal. For this function, the filler metal contains austenite-forming elements such as C, Ni, and Mn in a certain amount in proportion to ferrite-forming elements typified by Cr, Mo, and Si.

The filler metal prevents blowholes. For this function, it contains a strong deoxidizing agent such as Al, Ti, Zr, and V in a specific amount. Not only do these elements perform deoxidation but they also absorb nitrogen. This is important because pores in a sintered material contain nitrogen as well as oxygen. A deoxidizing agent (such as Mn and Si) alone is not enough to prevent blowholes; but it completely prevents blowholes when it is combined with a specific amount (0.2–5%) of the foregoing elements for deoxidation as well as denitration.

According to the present invention, the filler metal contains its components in specific amounts for the prevention of cold cracking and blowholes as explained below.

For prevention of cold cracking

When sintered materials with a comparatively high carbon content are joined by high energy density beam welding, while being supplied with a filler metal, it is impossible that the resulting weld metal entirely has the same composition as the filler metal. The ratio of the filler metal components in the entire weld metal would be about 50% from the practical point of view, if stable wire feeding is to be ensured. On this assumption, it is necessary that the filler metal have a composition specified by the equations below $Y \geq -(\frac{1}{3})X + 23$ and $Y \geq 12$ where $X = Cr(\%) + Mo(\%) + 1.5\, Si(\%)$
$Y = 1.2\, Ni(\%) + 20\, C(\%) + 0.8\, Mn(\%)$ so that the resulting weld metal has the austenite structure or the mixed structure of austenite and martensite (which is hard enough to be exempt from cold cracking). Incidentally, component X is composed of at least one of Cr, Mo, and Si, and component Y is composed of at least one of Ni, C, and Mn.

This basic idea will be explained below with reference to FIG. 2 (assuming that the base material is an iron-based sintered material containing 0.7% C). The upper region, in which there are open circles and dotted circles, indicates the composition of the filler metal which gives rise to a stable weld metal of the austenite structure free of cold cracking (or the mixed structure of austenite and martensite containing austenite in such an amount as to prevent cold cracking). The lower region, in which there are solid circles and half-solid circles, indicates the composition of the filler metal which gives rise to a weld metal of the martensite structure which suffers from cold cracking (or the mixed structure of martensite and austenite containing martensite in such an amount as to cause cold cracking). Between the two regions lies a borderline representing $Y \geq -(\frac{1}{3})X + 23$ and $Y \geq 12$. Needless to say, the borderline will move slightly depending on the composition of the sintered material and the feed rate of the filler metal. In such a case, it is necessary to adjust the components of the filler metal so that the resulting weld metal has the austenite structure free of cold cracking (or the mixed structure of austenite and martensite containing austenite in such an amount as to prevent cold cracking).

For the prevention of blowholes

The filler metal should be incorporated with at least one of Al, Ti, Zr, and V in an adequate amount (0.2–5%). They function as a strong deoxidizing agent as well as a nitrogen absorber. The content of these elements may be low in the case where the Mn content is considerably high. Even in such a case, the content of these elements should be 0.2% or more, preferably 0.3-5%. Excess amounts beyond add to no effect.

The foregoing idea makes it possible to modify the composition of the filler metal as shown in the following four embodiments.

EMBODIMENT 1

According to this embodiment, the filler metal contains 0.05-1% C, 15-30% Mn, and at least one selected from the group consisting of Al and Ti in a total amount of 0.2-3%, and optionally one or more selected from the group consisting of 2% or less Si, 1% or less Cu, 10% or less Ni, 4% or less Cr, and 2% or less Mo.

With this composition, the filler metal gives rise to the weld metal which contains as much carbon as or more carbon than the base metal and also contains a specific amount of Mn which is an austenite-forming element. This composition permits the weld metal to have the austenite structure or the austenite-martensite mixed structure, with the martensitic transformation inhibited. Hence, the weld metal is free of cold cracking. An additional effect of Mn is that it combines with S contained in the base metal to prevent hot cracking and it functions as a strong deoxidizing agent to prevent blowholes. A content less than 15% is not enough for Mn to stay sufficiently in the weld metal. An excess amount beyond 30% makes the production of the filler metal difficult but produces no additional effect, although the filler metal permits welding if its feed rate is adequately controlled.

Carbon is an austenite-forming element and hence helps the weld metal to become austenite. About 0.05% carbon is enough for the filler metal to achieve this object if the carbon content in the sintered material is as high as about 1%. Since ordinary sintered materials for machine parts usually contain more than 0.4% carbon for improved strength, it is not necessary for the filler metal to contain more than 1% carbon. Therefore, the adequate carbon content in the filler metal should range from 0.05 to 1%.

Si functions as a deoxidizing agent; but its content should be 2% or less so that the weld metal does not become austenite. Cu makes the weld metal liable to hot cracking on account of its segregation at the grain boundary of columnar crystals if it is contained 3% or more in the weld metal. Since sintered materials usually contain 1-2.5% Cu as a binder, the incorporation of Cu into the filler metal should be limited. An adequate amount is 1% or less in consideration of dilution by the base metal. Cr improves the corrosion resistance of the weld metal; but it is a ferrite-forming element and hence it prevents the weld metal from becoming austenite. The allowed content is 4% or less in the case of the filler metal free of Ni. Mo in an amount of 1% or less improves the strength of the sintered material; but it is a ferrite-forming element and hence its content should be 2% or less, with dilution by the base metal taken into account.

Al and Ti both function as a deoxidizing agent and nitrogen absorber as mentioned above. It is necessary for the filler metal to contain at least one of them in an amount of 0.2% or more. An amount more than 3% adds to no effect.

EMBODIMENT 2

A disadvantage of high energy density beam welding with a filler metal is that it is necessary to limit its amount to ensure a certain depth of penetration. This is true of the above-mentioned filler metal containing C, Mn (high content), Al, and Ti. It does not permit the weld metal to form the austenite structure completely but permits the weld metal to contain martensite in a considerable amount. The resulting weld metal is poor in toughness. This problem can be solved by filling a sheath of stainless steel (preferably austenite-type stainless steel) with the above-mentioned C-(high Mn)-Al-Ti metal in powder form. Since austenite-type stainless steel usually contains more than 7% Ni, the sheath supplies Ni in an amount sufficient to make the weld metal the austenite structure even though the supply of the filler metal is limited. The resulting weld metal has improved toughness. In addition, the filler metal in the sheathed form effectively prevents blowholes because the sheath also contains Cr which absorbs nitrogen.

The filler metal according to this embodiment is composed of a stainless steel sheath and a metal powder enclosed therein which contains 5-30% Mn and optionally 0.05-1% C and at least one selected from the group consisting of Al and Ti in a total amount of 0.2-3% (based on the total weight of the wire). The filler metal in the form of cored wire is advantageous in that it makes the weld metal austenite even with a lesser amount supplied.

The reason why the sheath is made of stainless steel is as follows: A filler wire formed by filling a sheath of mild steel with a metal powder containing C, Mn, Al, and Ti does not make the weld metal austenite completely when used for high energy density beam welding. The resulting weld metal contains a considerable amount of martensite and hence is poor in toughness. By contrast, a stainless steel sheath gives rise to tougher weld metal than a mild steel sheath, although it contains a large amount of Cr as its essential constituent, which is a ferrite-forming element and hence prevents the weld metal from becoming austenite. This holds true with a stainless steel sheath filled with a metal powder containing as much C or Mn as necessary to neutralize Cr. In addition, Cr also contributes to the prevention of blowholes because of its ability to absorb nitrogen. It is desirable to make the sheath from austenite-type stainless steel, because it contains more than 7% Ni in addition to Cr and hence helps the weld metal to become austenite with a lesser amount of the filler wire supplied. The resulting weld metal is good in toughness. Moreover, the fact that the stainless steel sheath does not rust makes the filler metal less liable to result in blowholes.

Mn is an austenite-forming element and also prevents hot cracking and functions as a deoxidizing agent. With a content less than 5%, the metal powder does not supply the weld metal with Mn sufficiently to prevent hot cracking and cold cracking, but makes the weld metal hard and poor in toughness. With a content in excess of 30%, the filler wire is difficult to produce and it adds to no effect, although it can be used for welding if it is supplied at a properly controlled rate. Therefore, the adequate content of Mn in the metal powder should be 5-30% of the total weight of the wire.

Al and Ti function as a deoxidizing agent as well as a nitrogen absorber. The filler metal should contain at least one of them in an amount of 0.2% or more. An amount in excess of 3% adds to no effect. The adequate amount of either or both of Al and Ti should be 0.2-3% of the total weight of the wire.

Since C is an austenite-forming element and helps the weld metal to become austenite, it is desirable to properly control the amount of C in the metal powder. In the case where the sintered material contains more than about 0.6% C, an amount of 0.5% C is enough for the filler metal to make the weld metal austenite completely. On the other hand, the sintered material for machine parts contains more than about 0.4% C for the improvement of strength. It follows, therefore, that a filler wire containing more than 1% C causes the weld metal to decrease in toughness. The adequate content of C in the metal powder should be 0.05–1% of the total weight of the wire.

EMBODIMENT 3

This embodiment is a solid wire developed to overcome the disadvantages involved in the above-mentioned C—(high Mn)—Al—Ti filler metal and cored wire. (The former has a disadvantage that it has to be supplied in a limited amount in order to ensure the depth of penetration and hence it cannot make the weld metal austenite completely. The latter is disadvantageous in that it easily deviates from the weld line under the beam (especially in the case of low output beams), the metal powder inside absorbs moisture through the seam of the sheath during storage for a long time, and wires of small diameter desirable for smooth supply are difficult to produce.) This solid wire contains 0.05–1% C, 2% or less Si, 5–30% Mn, 7–15% Ni, 20% Cr, and at least one selected from the group consisting of Al and Ti in a total amount of 0.2–3%, with the balance being Fe and inevitable impurities.

The amounts of C, Si, Al, and Ti in the solid wire are restricted for the same reason as mentioned above in Embodiment 1.

Mn is an austenite-forming element and also prevents hot cracking and functions as a deoxidizing agent. With a content less than 5%, the solid wire does not supply the weld metal with Mn sufficiently to prevent hot cracking and cold cracking, but makes the weld metal hard and poor in toughness. With a content in excess of 30%, the solid wire is difficult to produce (owing to poor drawability) and it adds to no effect. Therefore, the adequate content of Mn in the solid wire should be 5–30%.

Ni helps the weld metal to become austenite and improves the weld metal in toughness. For Ni to be effective, it is necessary that the solid wire contain 7% or more so that an adequate amount of Ni remains in the resulting weld metal. However, an amount in excess of 15% adds to no effect but leads to an increased production cost. Thus, the adequate amount should be 7–15%.

Cr improves the corrosion resistance of the weld metal and prevents blowholes through its nitrogen absorbing action; but it is a ferrite-forming element and hence it prevents the weld metal from becoming austenite. An amount in excess of 20% is detrimental to the transformation of the weld metal into austenite. Thus, the adequate amount of Cr should be 20% or less.

EMBODIMENT 4

It was found that the foregoing countermeasure against cold cracking and blowholes can also be applied to TIG and MIG arc welding, if the foregoing equations to specify the X and Y components are slightly modified as follows:

$$Y \geq -(\tfrac{1}{3})X + 18 \text{ and } Y \geq 7$$

In other words, in the case of arc welding the lower limit of the Y component in the filler metal is smaller than that in the case of laser welding. The reason for this is that arc welding dilutes the base metal less than laser welding and hence arc welding gives rise to the weld metal of desired structure even though the Y value of the filler metal is smaller.

WELDING METHOD

As mentioned above, the filler metal of the present invention is used to join two base metals, either or both of which are sintered materials. To be more specific, it is used to join sintered parts (of iron-based sintered material, for example) together or to join a sintered part to a steel part. The joining is accomplished by high energy density beam welding or TIG or MIG arc welding, with the former producing better effects. Especially, laser beam welding, which can be carried out in the air, is preferable. The filler metal for high energy density beam welding should be used in the form of wire having a diameter of 1.6 mm or less, preferably 1 mm or less for stable supply. This is important because the wire should match the small beam of high energy density beam welding.

EXAMPLES

The invention will be described in more detail with reference to the following examples.

EXAMPLE 1

This example demonstrates the joining of sintered materials together by laser welding.

Two pieces of the same sintered material were joined together by laser welding using a filler metal of different kind (in the form of wire 1.2 mm in diameter) as shown in FIG. 1. The piece measures 12 mm thick, 20 mm wide, and 100 mm long. The sintered material has the chemical composition (wt%) and density as shown in Table 1. The laser welding was performed under the conditions shown in Table 2. The filler metal has the chemical composition (wt%) as shown in Table 3. The weld zone was examined for defects by X-ray test and sectional surface inspection. The results are shown in Table 3.

Figure 2:
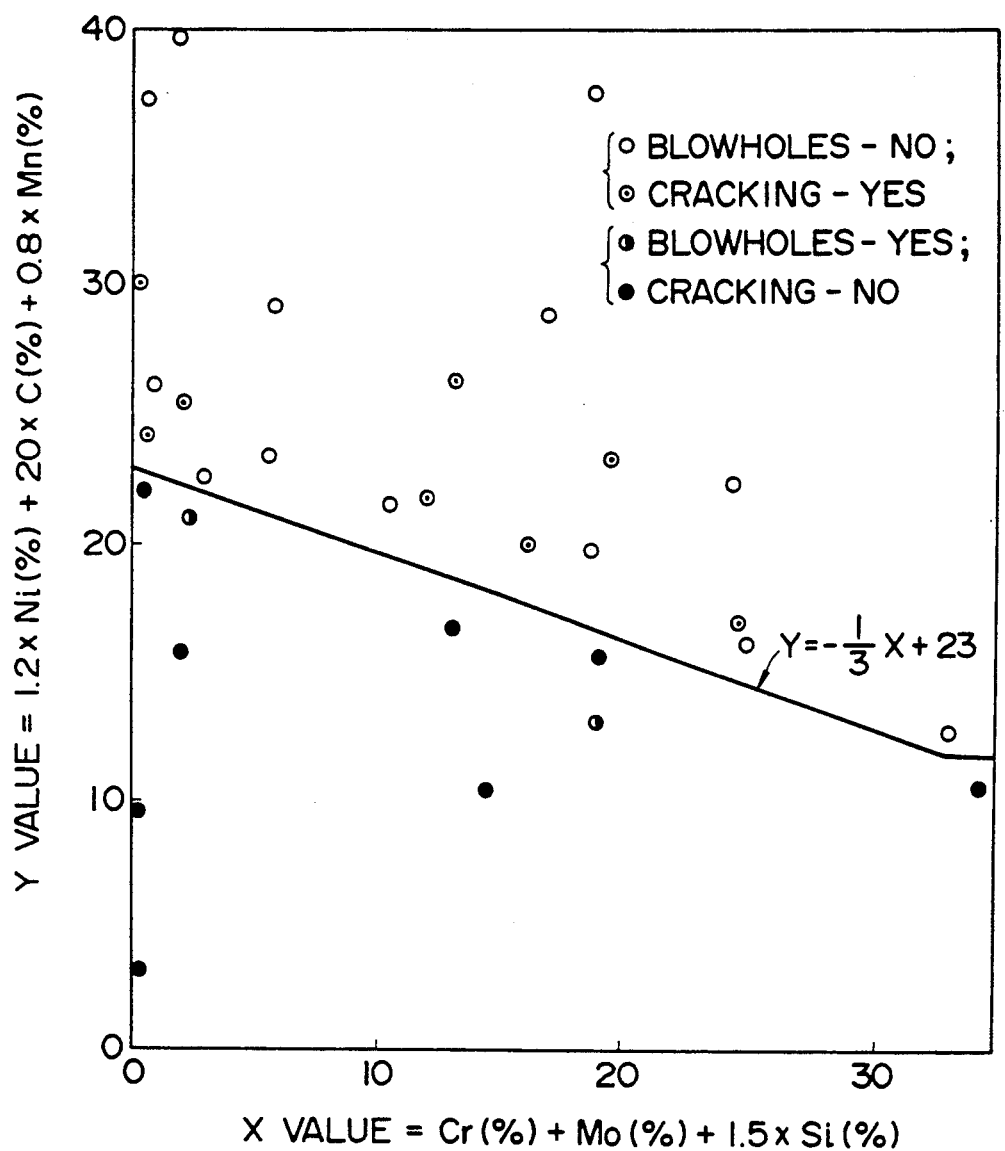
FIG. 2 is a graphical representation showing the relationship between the chemical composition (Y component and X component) of the filler metal and the presence or absence of defects (such as cold cracking and blowholes).

The test results are summarized in FIG. 2, which shows the relationship between the chemical composition of the filler metal and the defects of the weld zone. It is noted from FIG. 3 that the weld zone is free of blowholes and cold cracking if the filler metal has the specific composition defined by $Y \geq -(\tfrac{1}{2})X + 23$ and $Y \geq 12$ and also contains at least one selected from the group consisting of Al, Ti, Zr, and V in a total amount of 0.2–5%. Incidentally, the welding tests in this example were run by feeding the filler metal at nearly the maximum rate for stable supply that is permissible for the laser output and welding speed. Therefore, those samples of filler metal

TABLE 1

| C | Si | Mn | Cu | Balance | Density (g/cm$^3$) |
|---|----|----|----|---------|---------------------|
| 0.7 | 0.05 | 0.2 | 2.1 | Fe | 6.8 |

TABLE 2

| Welding speed | Output | Filler metal feed rate |
|---------------|--------|------------------------|
| 1.5 m/min | 7 KW | 4 m/min |

TABLE 3

| No. | C | Si | Mn | Ni | Cr | Mo | Al | Ti | Zr | V | X value | Y value | Blow-holes | Cold cracking |
|---|---|---|---|---|---|---|---|---|---|---|---|---|---|---|
| 1 | 0.1 | 0.2 | 1.4 | — | — | — | — | — | — | — | 0.3 | 3.1 | X | X |
| 2 | 0.1 | 0.2 | 1.8 | 5.1 | — | — | — | — | — | — | 0.3 | 9.6 | X | X |
| 3 | 0.4 | 0.3 | 3.5 | 4.2 | 1.2 | 0.5 | — | — | — | — | 2.0 | 15.8 | X | X |
| 4 | 0.1 | 0.4 | 1.8 | 8.1 | 18.4 | — | 1.4 | — | 1.2 | — | 19.0 | 13.2 | o | X |
| 5 | 0.4 | 0.2 | 13.5 | 2.2 | 1.5 | 0.5 | 1.2 | 0.5 | — | — | 2.3 | 21.4 | o | X |
| 6 | 0.6 | 0.3 | 1.4 | 7.4 | — | — | — | — | — | — | 0.5 | 22.0 | X | X |
| 7 | 0.2 | 0.4 | 7.6 | 4.8 | 18.3 | 0.2 | — | — | — | — | 19.1 | 15.8 | X | X |
| 8 | 0.4 | 0.4 | 7.2 | 2.5 | 12.3 | 0.3 | — | — | — | — | 13.1 | 16.8 | X | X |
| 9 | 0.2 | 0.4 | 2.0 | 4.3 | 29.5 | 4.2 | — | — | — | — | 34.3 | 10.8 | X | X |
| 10 | 0.2 | 0.5 | 1.8 | 4.2 | 13.5 | 0.2 | — | — | — | — | 14.5 | 10.5 | X | X |
| 11 | 0.1 | 0.5 | 1.8 | 11.4 | 23.5 | 0.3 | — | — | — | — | 24.6 | 17.1 | X | o |
| 12 | 0.2 | 0.4 | 25.3 | — | — | — | — | — | — | — | 0.6 | 24.2 | X | o |
| 13 | 0.4 | 0.2 | 13.9 | 2.2 | 11.5 | 0.2 | — | — | — | — | 12.0 | 21.8 | X | o |
| 14 | 0.1 | 0.3 | 2.1 | 18.2 | 1.5 | — | — | — | — | — | 2.0 | 25.5 | X | o |
| 15 | 0.4 | 0.6 | 7.5 | 7.8 | 17.4 | 1.2 | — | — | — | — | 19.5 | 23.4 | X | o |
| 16 | 0.3 | 0.4 | 10.4 | 4.7 | 15.2 | 0.4 | — | — | — | — | 16.2 | 20.0 | X | o |
| 17 | 0.4 | 0.2 | 27.8 | — | — | — | — | — | — | — | 0.3 | 30.2 | X | o |
| 18 | 0.5 | 0.4 | 20.5 | — | 12.5 | — | — | — | — | — | 13.1 | 26.4 | X | o |
| 19 | 0.1 | 0.4 | 1.4 | 11.0 | 24.1 | 0.2 | 1.2 | 0.8 | — | — | 24.9 | 16.3 | o | o |
| 20 | 0.3 | 0.5 | 25.1 | — | — | — | — | — | 0.5 | — | 0.8 | 26.1 | o | o |
| 21 | 0.5 | 0.2 | 10.8 | 2.4 | 10.2 | — | 0.3 | — | — | 1.0 | 10.5 | 21.5 | o | o |
| 22 | 0.2 | 0.4 | 1.8 | 14.3 | 2.2 | — | 2.3 | — | — | — | 2.8 | 22.6 | o | o |
| 23 | 0.2 | 0.4 | 7.8 | 8.0 | 18.1 | — | 0.3 | 0.4 | — | — | 18.7 | 19.8 | o | o |
| 24 | 0.5 | 0.5 | 23.6 | 7.4 | 17.6 | 0.4 | — | — | — | 2.5 | 18.8 | 37.8 | o | o |
| 25 | 0.4 | 0.7 | 19.4 | — | 3.2 | 1.2 | — | 0.6 | — | — | 5.5 | 23.5 | o | o |
| 26 | 0.4 | 0.4 | 14.0 | 8.1 | 16.4 | — | — | 1.2 | — | — | 17.0 | 28.9 | o | o |
| 27 | 0.2 | 0.4 | 6.4 | 3.2 | 28.7 | 3.6 | — | 0.4 | 0.5 | — | 32.9 | 12.9 | o | o |
| 28 | 0.5 | 0.8 | 23.2 | 0.5 | 4.5 | — | — | 0.6 | — | — | 5.7 | 29.2 | o | o |
| 29 | 0.2 | 0.3 | 6.2 | 11.2 | 23.8 | — | 0.3 | — | — | 0.6 | 24.3 | 22.4 | o | o |
| 30 | 0.8 | 0.4 | 26.8 | — | — | — | 0.3 | 0.4 | — | — | 0.6 | 37.4 | o | o |
| 31 | 0.1 | 0.2 | 1.8 | 30.2 | 1.5 | — | 1.5 | — | 2.4 | — | 1.8 | 39.7 | o | o |

(Note) Nos. 1-18 are comparative examples, and Nos. 19-31 are working examples.

which caused defects under the above-mentioned conditions are considered to be impracticable.

EXAMPLE 2

This example demonstrates the joining of sintered materials together by laser welding.

Two pieces of the same sintered material were joined together by laser welding using a filler metal of different kind. The piece measures 12 mm thick, 20 mm wide, and 100 mm long. The sintered material has the chemical composition (wt%) and density as shown in Table 4. The laser welding was performed under the conditions shown in Table 5. The filler metal is one which is designated as No. 20 and No. 24 in Table 3. The results of examination for defects are shown in Table 6. It is noted from Table 6 that the filler metal of the present invention provides a sound weld zone free of defects under varied welding conditions.

EXAMPLE 3

This example demonstrates the joining of a piece of sintered material to a piece of steel by laser welding.

A piece of sintered material was joined to a piece of steel S45C by laser welding using a filler metal. Both of the pieces measure 12 mm thick, 20 mm wide, and 100 mm long. The sintered material has the chemical composition (wt%) and density as shown in Table 1. The filler metal is one which is designated as No. 20 in Table 3.

TABLE 4

| Code | C | Si | Mn | Cu | Ni | Mo | Balance | Density (g/cm³) |
|---|---|---|---|---|---|---|---|---|
| A | 0.5 | 0.05 | 0.2 | 2.0 | 3.9 | 0.5 | Fe | 6.8 |
| B | 0.8 | 0.06 | 0.3 | 1.8 | — | — | Fe | 6.7 |

TABLE 5

| Welding speed | Output | Filler metal feed rate |
|---|---|---|
| 1.0~3.5 m/min | 4~8 KW | 1~4 m/min |

TABLE 6

| Base metal | Wire No. | Welding speed (m/min) | Output (KW) | Wire feed rate (m/min) | Weld defects |
|---|---|---|---|---|---|
| A | 20 | 1.0 | 4 | 2.0 | None |
|  |  | 1.0 | 5 | 3.0 | " |
|  |  | 2.0 | 6 | 3.0 | " |
|  |  | 3.0 | 6 | 3.0 | " |
|  | 24 | 1.0 | 4 | 1.0 | " |
|  |  | 1.5 | 5 | 2.0 | " |
|  |  | 1.5 | 7 | 2.0 | " |
|  |  | 2.5 | 5 | 1.5 | " |
|  |  | 2.5 | 8 | 2.0 | " |
|  |  | 3.5 | 7 | 2.0 | " |
| B | 20 | 1.5 | 4 | 2.5 | " |
|  |  | 1.5 | 6 | 3.0 | " |
|  |  | 2.5 | 6 | 3.0 | " |
|  |  | 3.5 | 6 | 3.0 | " |
|  | 24 | 1.5 | 4 | 1.0 | " |
|  |  | 1.5 | 6 | 2.0 | " |
|  |  | 2.5 | 5 | 2.0 | " |
|  |  | 2.5 | 8 | 2.5 | " |
|  |  | 3.5 | 6 | 2.0 | " |

The laser welding was performed at a welding speed of 1.5 m/min and a wire feed rate of 3 m/min, with a laser output of 5 kW. The weld zone was examined for defects in the same manner as in Example 1. The weld zone was found to be sound and free of defects.

EXAMPLE 4

This example demonstrates the joining of a piece of sintered material to a piece of steel by laser welding.

A piece of sintered material was joined to a piece of steel S48C by laser welding using a filler metal. Both of the pieces measure 12 mm thick, 20 mm wide, and 100 mm long. The sintered material has the chemical composition (wt%) and density as shown in Table 1. The filler metal is one which is designated as No. 23 in Table 3. The laser welding was performed at a welding speed of 1.5 m/min and a wire feed rate of 4 m/min, with a laser output of 7 kW. The weld zone was examined for defects in the same manner as in Example 1. The weld zone was found to be sound and free of defects.

and a varied wire feed rate of 0–5 m/min, with a fixed laser output of 6 kW.

TABLE 7

| Code | C | Si | Mn | Cu | Ni | Cr | Mo | Balance | Density (g/cm³) |
|------|-----|------|------|-----|-----|----|-----|---------|------------------|
| A | 0.8 | 0.05 | 0.20 | 2.0 | — | — | — | Fe | 6.8 |
| B | 0.6 | 0.05 | 0.20 | 2.0 | 4.2 | — | 0.5 | Fe | 6.9 |

TABLE 8

| Welding speed | Output | Filler metal feed rate |
|---------------|--------|------------------------|
| 1.5 m/min | 7 KW | 3~5 m/min |

TABLE 9

| No. | C | Si | Mn | Al | Ti | Ni | Blowholes | Cold cracking | Hot cracking | Base metal | Remarks |
|-----|------|-----|------|-----|-----|-----|-----------|---------------|--------------|------------|---------|
| 1 | 0.1 | 0.4 | 0.1 | — | — | — | X | X | X | A | Comparative examples |
| 2 | 0.1 | 0.2 | 7.3 | — | — | — | X | X | X | A | |
| 3 | 0.1 | 0.3 | 12.2 | — | — | — | X | X | X | A | |
| 4 | 0.4 | 0.2 | 18.0 | 0.1 | — | — | X | ○ | X | B | |
| 5 | 0.4 | 0.2 | 26.6 | — | — | — | X | ○ | ○ | A | |
| 6 | 0.5 | 0.3 | 10.8 | 0.2 | 0.3 | — | ○ | X | X | A | |
| 7 | 0.8 | 0.3 | 13.5 | 0.3 | 0.3 | — | ○ | X | ○ | B | |
| 8 | 0.4 | 0.5 | 1.3 | — | — | 9.2 | X | X | ○ | B | |
| 9 | 0.05 | 0.3 | 28.7 | 0.2 | 0.3 | — | ○ | ○ | ○ | A | Working examples |
| 10 | 0.6 | 0.2 | 17.1 | 0.3 | — | — | ○ | ○ | ○ | A | |
| 11 | 0.5 | 0.3 | 24.5 | — | 0.2 | — | ○ | ○ | ○ | A | |
| 12 | 0.3 | 0.4 | 26.5 | 1.2 | 1.4 | — | ○ | ○ | ○ | B | |
| 13 | 0.3 | 0.3 | 18.2 | 0.2 | 0.2 | 4.5 | ○ | ○ | ○ | B | |
| 14 | 0.8 | 0.2 | 24.3 | 0.4 | — | — | ○ | ○ | ○ | A | |

EXAMPLE 5

This example demonstrates the joining of sintered materials together by laser welding.

Two pieces of the same sintered material were joined together by laser welding using a filler metal of different kind. The piece measures 20 mm thick, 20 mm wide, and 100 mm long. The sintered material has the chemical composition (wt%) and density as shown in Table 7. The laser welding was performed as shown in FIG. 1 under the conditions as shown in Table 8. The filler metal has the chemical composition (wt%) as shown in Table 9 and is in the form of wire 1.2 mm in diameter. The weld zone was examined for defects by X-ray test and sectional surface inspection. The results are shown in Table 9.

Figure 3:
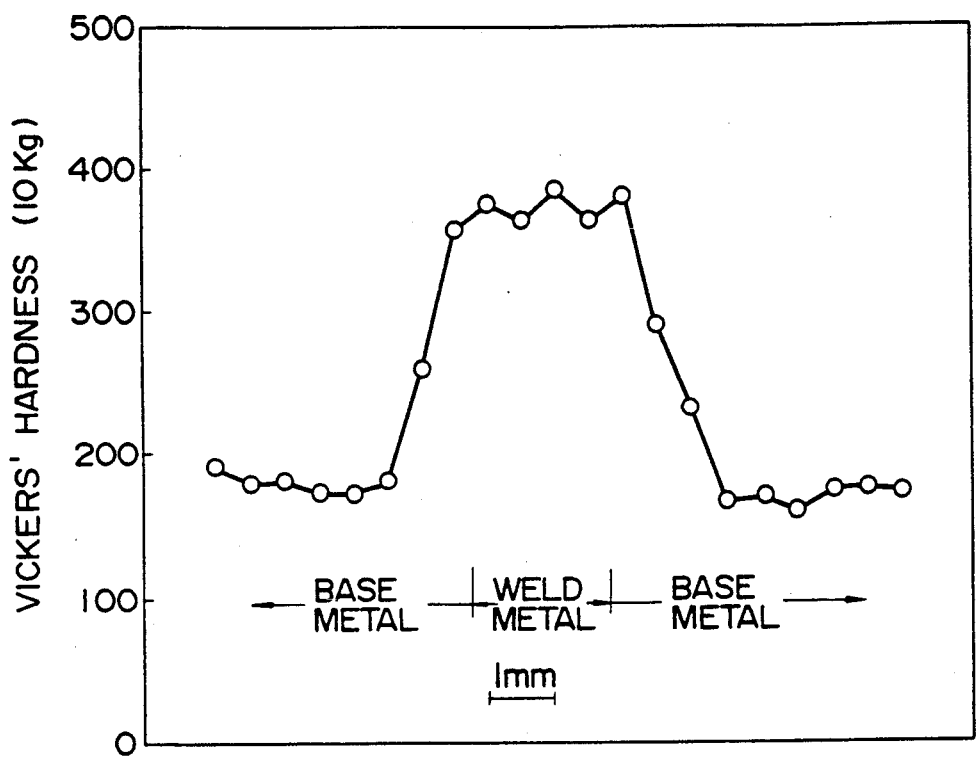
FIG. 3 is a diagram showing the distribution of hardness in the weld zone obtained in Example.

It is noted from Table 9 that the filler metals, Nos. 9–14, pertaining to the present invention all give rise to weld metal free of such defects as cold cracking, hot cracking, and blowholes. The filler metal No. 12 gave a weld zone which has a hardness distribution as shown in FIG. 3. FIG. 3 indicates that the weld metal has sufficient hardness and meets requirements for strength.

EXAMPLE 6

This example demonstrates the joining of a piece of sintered material to a piece of steel by laser welding.

A piece of sintered material designated as A in Table 7 was joined to a piece of steel S45C by laser welding using a filler metal. Both of the pieces measure 20 mm thick, 20 mm wide, and 100 mm long. The filler metal is one which is designated as No.12 in Table 9. The laser welding was performed at a welding speed of 1.5 m/min

TABLE 10

| No. | Filler metal feed rate (m/min) | State of welded part | | |
|-----|-------------------------------|----------|--------------|---------------|
| | | Blowholes | Hot cracking | Cold cracking |
| 1 | 0 | X | X | X |
| 2 | 1 | X | X | X |
| 3 | 2 | ○ | X | X |
| 4 | 3 | ○ | X | ○ |
| 5 | 4 | ○ | ○ | ○ |
| 6 | 5 | ○ | ○ | ○ |

The weld zone was examined for defects by X-ray test and sectional surface inspection in the same manner as in Example 1. The results are shown in Table 10. It was found that the filler metal of the present invention gives rise to a sound weld zone when it is fed at a rate above a certain limit.

EXAMPLE 7

This example demonstrates the joining of sintered materials together by MIG welding.

Two pieces of the same sintered material were joined together by MIG welding (bead on plate) using a filler metal. The piece measures 20 mm thick, 20 mm wide, and 100 mm long. The sintered material has the chemical composition (wt%) and density as shown in Table 7. The filler metal is one which is designated as No. 12 in Table 9. The MIG welding was performed at a welding speed of 40 cm/min using a current of 170A and a voltage of 25V and a shield gas of Ar plus 20% $CO_2$.

The surface and cross section of the weld zone were examined for defects. It was found that the filler metal gives a sound weld zone. Incidentally, it was also found that the weld metal has a hardness of Hv 200, which is sufficient but slightly lower than that in the case of laser welding because the filler metal is diluted less by the base metal.

EXAMPLE 8

This example demonstrates the joining of sintered materials together by laser welding.

Two pieces of the same sintered material were joined together by laser welding using a filler metal of different kind. The piece measures 20 mm thick, 20 mm wide, and 100 mm long. The sintered material has the chemical composition (wt%) and density as shown in Table 11.

The laser welding was performed under the conditions as shown in Table 13. The filler metal has the chemical composition (wt%) as shown in Table 12 and is in the form of wire 1 mm in diameter. The weld zone was examined for defects by X-ray test and sectional surface inspection and also for chemical composition. The results are shown in Table 14.

Figure 4:
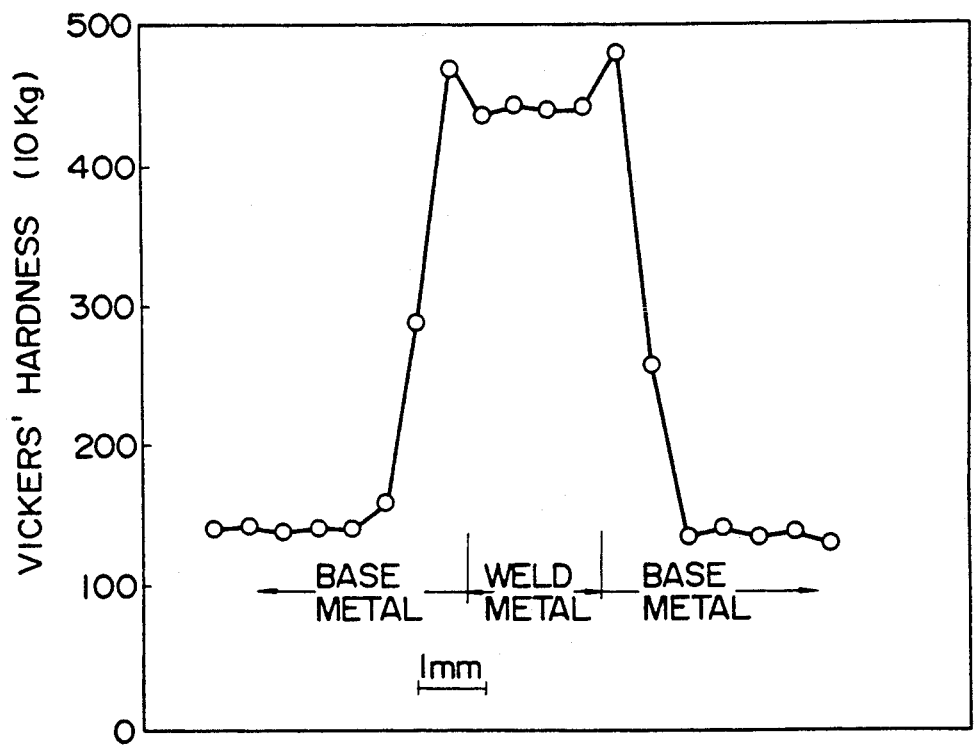
FIG. 4 is a diagram showing the distribution of hardness in the weld zone obtained in Example.

It is noted from Table 14 that in the case where the weld metal contains 0.3% or more C, 3% or more Mn, and at least one selected from the group consisting of Al and Ti in an amount of 0.03% or more, the weld metal is free from hot cracking, cold cracking, and blowholes. The weld zone of sample No. 5 has the hardness distribution as shown in FIG. 4. This hardness distribution suggests that the weld metal has sufficient hardness and meets requirements for strength.

TABLE 12-continued

| Code | C | Si | Mn | Al | Ti | Balance |
|------|-----|------|------|-----|-----|---------|
| 7 | 0.1 | 0.43 | 1.5 | — | — | Fe |

TABLE 13

| Welding speed | Output | Filler metal feed rate |
|---------------|--------|------------------------|
| 1~2 m/min | 4~8 KW | 0~5 m/min |

TABLE 14

| No. | Base metal | Filler metal | C | Si | Mn | Cu | Ni | Cr | Mo | Al | Ti | Blowholes | Hot cracking | Cold cracking |
|-----|------|------|-----|------|-----|-----|-----|-----|-----|------|------|---|---|---|
| 1 | A | 1 | 0.7 | 0.06 | 1.5 | 1.8 | — | — | — | 0.01 | 0.01 | X | X | X |
| 2 | A | 1 | 0.7 | 0.07 | 2.3 | 1.7 | — | — | — | 0.03 | 0.03 | o | X | X |
| 3 | A | 1 | 0.7 | 0.09 | 3.5 | 1.5 | — | — | — | 0.04 | 0.04 | o | o | o |
| 4 | A | 2 | 0.6 | 0.10 | 3.4 | 1.6 | — | — | — | — | — | X | o | o |
| 5 | A | 3 | 0.7 | 0.09 | 3.4 | 1.6 | — | — | — | 0.03 | — | o | o | o |
| 6 | A | 4 | 0.7 | 0.10 | 3.3 | 1.7 | — | — | — | — | 0.04 | o | o | o |
| 7 | A | 5 | 0.5 | 0.12 | 3.8 | 1.4 | — | — | — | 0.03 | 0.03 | o | o | o |
| 8 | A | 7 | 0.6 | 0.18 | 0.8 | 1.2 | — | — | — | — | — | X | X | X |
| 9 | A | | 0.8 | 0.04 | 0.1 | 2.0 | — | — | — | — | — | X | X | X |
| 10 | B | 1 | 0.6 | 0.06 | 1.9 | 1.8 | 3.5 | — | 0.4 | 0.01 | 0.02 | X | X | X |
| 11 | B | 1 | 0.6 | 0.08 | 3.5 | 1.6 | 3.2 | — | 0.4 | 0.03 | 0.03 | o | o | o |
| 12 | B | 2 | 0.6 | 0.09 | 3.3 | 1.6 | 3.2 | — | 0.4 | — | — | X | o | o |
| 13 | B | 5 | 0.5 | 0.08 | 1.8 | 1.7 | 3.4 | — | 0.4 | 0.01 | 0.02 | X | X | X |
| 14 | B | 5 | 0.4 | 0.11 | 3.7 | 1.5 | 3.1 | — | 0.4 | 0.03 | 0.03 | o | o | o |
| 15 | B | 6 | 0.4 | 0.12 | 1.6 | 1.5 | 2.0 | — | 0.3 | 0.02 | 0.03 | o | X | X |
| 16 | B | 7 | 0.4 | 0.16 | 0.7 | 1.4 | 2.8 | — | 0.3 | — | — | X | X | X |
| 17 | C | 1 | 0.5 | 0.05 | 2.1 | 1.6 | — | 0.9 | 0.2 | 0.03 | 0.04 | o | X | X |
| 18 | C | 1 | 0.5 | 0.06 | 4.7 | 1.3 | — | 0.8 | 0.1 | 0.04 | 0.05 | o | o | o |
| 19 | C | 2 | 0.5 | 0.06 | 3.8 | 1.4 | — | 0.9 | 0.1 | — | — | X | o | o |
| 20 | C | 3 | 0.5 | 0.05 | 4.0 | 1.4 | — | 0.8 | 0.1 | 0.04 | — | o | o | o |
| 21 | C | 4 | 0.5 | 0.06 | 4.1 | 1.4 | — | 0.8 | 0.1 | — | 0.04 | o | o | o |
| 22 | C | 5 | 0.3 | 0.08 | 4.4 | 1.2 | — | 0.7 | 0.1 | 0.03 | 0.03 | o | o | o |
| 23 | C | 7 | 0.3 | 0.17 | 0.8 | 1.3 | — | 0.7 | 0.1 | — | — | X | X | o |
| 24 | C | | 0.5 | 0.02 | 0.1 | 1.9 | — | 1.1 | 0.2 | — | — | X | X | X |

TABLE 11

| Code | C | Si | Mn | Cu | Ni | Cr | Mo | Balance | Density (g/cm³) |
|------|-----|------|------|-----|-----|-----|-----|---------|-----------------|
| A | 0.8 | 0.05 | 0.20 | 2.0 | — | — | — | Fe | 6.8 |
| B | 0.6 | 0.05 | 0.20 | 2.0 | 4.2 | — | 0.5 | Fe | 6.9 |
| C | 0.5 | 0.03 | 0.15 | 2.1 | — | 1.2 | 0.2 | Fe | 6.9 |

TABLE 12

| Code | C | Si | Mn | Al | Ti | Balance |
|------|-----|------|------|-----|-----|---------|
| 1 | 0.5 | 0.20 | 25.5 | 0.3 | 0.3 | Fe |
| 2 | 0.5 | 0.20 | 25.0 | — | — | Fe |
| 3 | 0.5 | 0.15 | 26.0 | 0.3 | — | Fe |
| 4 | 0.5 | 0.20 | 25.5 | — | 0.3 | Fe |
| 5 | 0.1 | 0.25 | 25.3 | 0.2 | 0.2 | Fe |
| 6 | 0.1 | 0.23 | 10.7 | 0.2 | 0.2 | Fe |

EXAMPLE 9

This example demonstrates the joining of a piece of sintered material to a piece of steel by laser welding.

A piece of sintered material was joined to a piece of steel S45C by laser welding using a filler metal. Both of the pieces measure 20 mm thick, 20 mm wide, and 100 mm long. The sintered material has the chemical composition (wt%) and density as shown in Table 11. The filler metal is in the form of wire designated as Code 1 in Table 12. The laser welding was performed under the conditions shown in Table 15. The weld zone was examined in the same manner as in Example 8. The results are shown in Table 16. It is noted from Table 16 that a sound weld zone can be obtained in the joining of a sintered material to steel if proper control is made so that the weld metal has the range of chemical composition as shown in Example 8.

EXAMPLE 10

This example demonstrates the joining of sintered materials together by laser welding.

Two pieces of the same sintered material were joined together by laser welding using a filler metal of different kind. The piece measures 12 mm thick, 20 mm wide, and 100 mm long. The sintered material has the chemical composition (wt%) and density as shown in Table 17. The laser welding was performed under the conditions as shown in Table 18.

TABLE 15

| Welding speed | Output | Filler metal feed rate |
| --- | --- | --- |
| 0.5 m/min | 7 KW | 0~4 m/min |

TABLE 16

| No. | Filler metal feed rate (m/min) | Chemical composition of weld metal (wt %) | | | | | | Blowholes | Hot cracking | Cold cracking |
| --- | --- | --- | --- | --- | --- | --- | --- | --- | --- | --- |
| | | C | Si | Mn | Cu | Al | Ti | | | |
| 1 | 0 | 0.6 | 0.12 | 0.4 | 0.9 | — | — | X | X | X |
| 2 | 1 | 0.6 | 0.14 | 1.2 | 0.8 | 0.01 | 0.01 | o | X | X |
| 3 | 2 | 0.6 | 0.15 | 2.0 | 0.8 | 0.03 | 0.02 | o | o | o |
| 4 | 3 | 0.6 | 0.17 | 3.2 | 0.7 | 0.04 | 0.04 | o | o | o |
| 5 | 4 | 0.6 | 0.17 | 4.1 | 0.7 | 0.05 | 0.04 | o | o | o |

TABLE 17

| Code | Composition of sintered material (wt %) | | | | | Density (g/cm³) |
| --- | --- | --- | --- | --- | --- | --- |
| | C | Si | Mn | Cu | Balance | |
| A | 0.8 | 0.05 | 0.20 | 2.0 | Fe | 6.8 |
| B | 0.4 | 0.04 | 0.22 | 2.1 | Fe | 6.9 |

TABLE 18

| Conditions of laser welding | | |
| --- | --- | --- |
| Welding speed | Output | Filler wire feed rate |
| 1.5 m/min | 7 KW | 3~4 m/min |

The filler metal has the chemical composition (wt%) as shown in Table 19 and is in the form of cored wire 1.2 mm in diameter, with the sheath being made of mild steel or austenite stainless steel (SUS304). The weld zone was examined for defects by X-ray test and sectional surface inspection and also tested for impact strength. The results are shown in Table 19. The impact test was performed on a test piece (with a 2 mm V-notch), measuring 10 x 10 x 55 mm, cut out of the pieces joined together by laser welding for both sides under the same conditions. The test specimens were regarded as acceptable if the impact strength (energy absorbed at normal temperature) is greater than 1.2 kgf·m.

It is noted from Table 19 that the filler metals, Nos. 10-15, pertaining to the present invention all give rise to the weld metal which is free of such defects as cold cracking, hot cracking, and blowholes, and has desired toughness.

EXAMPLE 11

This example demonstrates the joining of a piece of sintered material to a piece of steel by laser welding.

A piece of sintered material designated as A in Table 17 was joined to a piece of steel S45C by laser welding using a filler metal. Both of the pieces measure 20 mm thick, 20 mm wide, and 100 mm long. The filler metal is in the form of wire designated as No. 10 in Table 19.

TABLE 19

| Code | Test No. | Sheath | Chemical composition of metal powder (wt %) | | | | | Blowholes | Hot cracking | Cold cracking | Impact value | Code of base metal |
| --- | --- | --- | --- | --- | --- | --- | --- | --- | --- | --- | --- | --- |
| | | | C | Si | Mn | Al | Ti | | | | | |
| Comparative examples | 1 | Mild steel | 0.1 | 0.2 | 1.5 | — | — | X | X | X | — | A |
| | 2 | " | 0.4 | 0.2 | 18.0 | — | — | X | o | X | — | A |
| | 3 | " | 0.4 | 0.2 | 25.8 | — | — | X | o | o | X | A |
| | 4 | " | 0.5 | 0.3 | 10.5 | 0.2 | 0.3 | o | X | X | — | B |
| | 5 | " | 0.5 | 0.3 | 26.5 | 0.2 | 0.3 | o | o | o | X | A |
| | 6 | SUS304 | 0.2 | 0.2 | 1.7 | — | — | X | X | X | — | B |
| | 7 | SUS304 | 0.5 | 0.1 | 7.5 | — | — | X | o | o | o | A |
| | 8 | SUS304 | 0.4 | 0.2 | 23.5 | — | — | X | o | o | o | B |
| | 9 | SUS304 | 0.7 | 0.3 | 3.7 | 0.3 | 0.4 | o | X | X | X | B |
| Working examples | 10 | SUS304 | 0.5 | 0.2 | 23.8 | 0.3 | 0.2 | o | o | o | o | A |
| | 11 | SUS304 | 0.8 | 0.3 | 22.7 | 0.2 | — | o | o | o | o | B |
| | 12 | SUS304 | 0.05 | 0.2 | 26.7 | — | 0.5 | o | o | o | o | A |
| | 13 | SUS304 | 0.6 | — | 6.2 | 0.5 | 0.7 | o | o | o | o | A |
| | 14 | SUS304 | 0.4 | 0.2 | 15.6 | 1.2 | 1.3 | o | o | o | o | A |
| | 15 | SUS304 | 0.5 | 0.2 | 23.4 | 0.3 | 0.6 | o | o | o | o | B |

(Note) The chemical composition of metal powder is expressed in wt % based on the total weight of wire.

The laser welding was performed at a welding speed of 1.5 m/min and a varied wire feed rate of 0-5 m/min, with a fixed laser output of 7 kW. The weld zone was examined for defects and the weld metal was tested for hardness and toughness. The results are shown in Table 20. It was found that the filler metal of the present invention gives rise to a sound weld zone having good mechanical performance when it is fed at a rate above a certain limit.

EXAMPLE 12

This example demonstrates the joining of sintered materials together by laser welding.

Two pieces of the same sintered material were joined together by laser welding using a filler metal of different kind. The piece measures 12 mm thick, 20 mm wide, and 100 mm long. The sintered material has the chemical composition (wt%) and density as shown in Table 21. The laser welding was performed under the conditions as shown in Table 22. The filler metal has the chemical composition (wt%) as shown in Table 23 and is in the form of wire 1 mm in diameter. The weld zone was examined for defects by X-ray test and sectional surface inspection, and the weld metal was tested for impact strength and evaluated in the same manner as in Example 10. The results are shown in Table 23.

TABLE 20

| Test No. | Filler metal feed rate (m/min) | Defects of welding | | | Weld metal | | Overall rating |
|---|---|---|---|---|---|---|---|
| | | Blowholes | Hot cracking | Cold cracking | Hardness (Hv) | Impact value (kgf · m) | |
| 1 | 0 | X | X | X | 662 | — | X |
| 2 | 1 | o | X | X | 675 | — | X |
| 3 | 2 | o | o | o | 480 | 0.4 | Δ |
| 4 | 3 | o | o | o | 202 | 4.2 | o |
| 5 | 4 | o | o | o | 198 | 4.6 | o |
| 6 | 5 | o | o | o | 190 | 4.7 | o |

TABLE 21

| C | Si | Mn | Cu | Balance | Density (g/cm$^3$) |
|---|---|---|---|---|---|
| 0.7 | 0.05 | 0.2 | 2.1 | Fe | 6.8 |

TABLE 22

| Welding speed | Output | Filler metal feed rate |
|---|---|---|
| 1.5 m/min | 5 KW | 3 m/min |

TABLE 23

| No. | Chemical composition of filler metal (wt %) | | | | | | | Blowholes | Hot cracking | Cold cracking | Impact value | Overall rating | Examples |
|---|---|---|---|---|---|---|---|---|---|---|---|---|---|
| | C | Si | Mn | Ni | Cr | Al | Ti | | | | | | |
| 1 | 0.1 | 0.2 | 1.4 | — | — | — | — | X | X | X | X | X | Comparative examples |
| 2 | 0.3 | 0.2 | 17.2 | 2.1 | — | — | — | X | o | X | X | X | Comparative examples |
| 3 | 0.4 | 0.4 | 22.4 | — | 1.2 | 0.2 | 0.2 | o | o | o | X | X | Comparative examples |
| 4 | 0.3 | 0.2 | 18.3 | — | 13.4 | 0.3 | 0.2 | o | o | X | X | X | Comparative examples |
| 5 | 0.1 | 0.2 | 2.4 | 8.1 | 18.5 | — | — | X | X | X | X | X | Comparative examples |
| 6 | 0.4 | 0.3 | 12.4 | 7.9 | — | — | — | X | o | o | X | X | Comparative examples |
| 7 | 0.2 | 0.4 | 3.7 | 8.2 | 18.3 | 0.2 | 0.3 | o | X | X | X | X | Comparative examples |
| 8 | 0.1 | 0.7 | 7.2 | 7.5 | 21.7 | 0.3 | 0.4 | o | o | X | X | X | Comparative examples |
| 9 | 0.2 | 2.5 | 7.4 | 8.3 | 7.5 | 0.4 | 0.2 | o | o | X | X | X | Comparative examples |
| 10 | 0.4 | 0.2 | 7.8 | 8.4 | 0.5 | 0.2 | 0.2 | o | o | o | o | o | Working examples |
| 11 | 0.5 | 0.5 | 22.5 | 7.7 | 17.6 | 0.3 | 0.1 | o | o | o | o | o | Working examples |
| 12 | 0.07 | 0.2 | 24.3 | 10.2 | — | 0.5 | — | o | o | o | o | o | Working examples |
| 13 | 0.8 | 0.6 | 14.9 | 8.0 | 0.5 | — | 0.6 | o | o | o | o | o | Working examples |
| 14 | 0.4 | — | 23.1 | 9.2 | 15.6 | 0.2 | 0.4 | o | o | o | o | o | Working examples |
| 15 | 0.5 | 0.2 | 17.5 | 14.8 | 17.4 | 1.2 | 1.4 | o | o | o | o | o | Working examples |
| 16 | 0.2 | 0.3 | 27.8 | 8.7 | 13.2 | 0.3 | — | o | o | o | o | o | Working examples |

It is noted from Table 23 that the filler metals pertaining to the present invention all give the weld metal which is free of such defects as cold cracking, hot cracking, and blowholes and has sufficient toughness.

EXAMPLE 13

This example demonstrates the stable feeding of the filler metal in laser welding.

Two considerably long pieces of the same sintered material were joined together by laser welding using a filler metal. The piece measures 12 mm thick, 20 mm wide, and 300 mm long. The sintered material has the chemical composition as shown in Table 21. The laser welding was performed under the conditions as shown in Table 24. The filler metal is a solid wire (1 mm in diameter) designated as No. 11 in Table 23. This solid wire was compared with a cored wire (1.2 mm diameter) of the same composition for feed stability. The laser welding was performed under different conditions while feeding the filler metal wire at a prescribed rate to see if the wire is smoothly fed without deviation from the weld line. The results are shown in Table 24. It is noted from Table 24 that in the laser welding with a comparative low laser output, the cored wire for comparison is liable to unstable feeding, whereas the solid wire of the present invention permits stable feeding.

TABLE 24

| Filler metal | Welding speed (m/min) | Output (KW) | Wire feed speed (m/min) | Feed stability | Example |
|---|---|---|---|---|---|
| Cored wire (1.2φ) | 1.5 | 7 | 2.5 | o | Comparative example |
| | | | 3.5 | o | |
| | | 5 | 1.5 | o | |
| | | | 2.5 | o | |
| | | 4 | 1.5 | X | |
| | | | 2.5 | X | |
| | 2.5 | 7 | 2.5 | o | |
| | | | 3.5 | X | |
| | | 5 | 1.5 | X | |
| | | | 2.5 | X | |

TABLE 24-continued

| Filler metal | Welding speed (m/min) | Output (KW) | Wire feed speed (m/min) | Feed stability | Example |
|---|---|---|---|---|---|
| Solid wire (1.0φ) | 1.5 | 7 | 4 | ○ | Working example |
|  |  |  | 5 | ○ |  |
|  |  |  | 6 | ○ |  |
|  |  | 5 | 3 | ○ |  |
|  |  |  | 4 | ○ |  |
|  |  | 4 | 3 | ○ |  |
|  |  |  | 4 | ○ |  |
|  | 2.5 | 7 | 4 | ○ |  |
|  |  |  | 5 | ○ |  |
|  |  |  | 6 | ○ |  |
|  |  | 5 | 3 | ○ |  |
|  |  |  | 4 | ○ |  |

EXAMPLE 14

This example demonstrates the effect of the moisture absorption of the filler metal.

Laser welding was performed using a solid wire which had been exposed to a moist atmosphere, to see if the moisture absorption affects the laser welding. For comparison, the same test was run using a cored wire. The base metal used for the test is the sintered material used in Example 12. The solid wire is one which is designated as No. 11 in Table 23. The cored wire is one which has the same chemical composition as the solid wire and is 1.2 mm in diameter. For moisture absorption, the wires were allowed to stand for a prescribed period of time in a thermohydrostat at 30° C. and 80% RH. Welding was performed at a welding speed of 1.5 m/min with a laser output of 7 kW. The solid wire was fed at 4 m/min, and the cored wire was fed at 2.7 m/min.

The weld zone was examined for defects, especially blowholes, by X-ray test and sectional surface inspection. The results are shown in Table 25. It is noted from Table 25 that after exposure to the moist atmosphere for more than 2 months, the cored wire adversely affects welding, whereas the solid wire hardly affects welding.

TABLE 25

| Filler metal | Period of moisture absorption | Blowholes | Example |
|---|---|---|---|
| Cored wire | 2 weeks | ○ | Comparative examples |
|  | 1 month | ○ |  |
|  | 2 months | X |  |
|  | 3 months | X |  |
|  | 6 months | X |  |
| Solid wire | 2 weeks | ○ | Working examples |
|  | 1 month | ○ |  |
|  | 2 months | ○ |  |
|  | 3 months | ○ |  |
|  | 6 months | ○ |  |
|  | 8 months | ○ |  |

TABLE 25-continued

| Filler metal | Period of moisture absorption | Blowholes | Example |
|---|---|---|---|
|  | 1 year | ○ |  |

EXAMPLE 15

This example demonstrates the joining of a piece of sintered material to a piece of steel by laser welding.

A piece of sintered material was joined to a piece of steel S48C by laser welding using a filler metal. Both of the pieces measure 12 mm thick, 20 mm wide, and 100 mm long. The sintered material has the chemical composition (wt%) and density as shown in Table 21. The filler metal is a wire designated as No. 11 in Table 23. The laser welding was performed at a welding speed of 1.5 m/min and a wire feed rate of 4 m/min, with a laser output of 7 kW. The weld zone was examined for defects by X-ray test and sectional surface inspection. The weld zone was found to be sound and free of defects.

EXAMPLE 16

This example demonstrates the joining of sintered materials together by TIG welding.

Two pieces of the same sintered material were joined together by TIG welding using a filler metal of different kind. The piece measures 12 mm thick, 20 mm wide, and 100 mm long. The sintered material has the chemical composition (wt%) and density as shown in Table 1. The filler metal has the composition as shown in Table 26. The TIG welding was performed under the following conditions.

TABLE 26

| No. | Chemical composition of filler metal (wt %) | | | | | | | | | | X value | Y value | Blowholes | Cracking |
|---|---|---|---|---|---|---|---|---|---|---|---|---|---|---|
|  | C | Si | Mn | Ni | Cr | Mo | Al | Ti | Zr | V |  |  |  |  |
| 1 | 0.1 | 0.4 | 1.8 | 8.1 | 18.4 | — | 2.0 | 0.5 | — | — | 19.0 | 13.2 | ○ | ○ |
| 2 | 0.2 | 0.4 | 7.8 | 4.2 | 12.5 | — | 0.5 | — | 1.5 | — | 12.7 | 15.3 | ○ | ○ |
| 3 | 0.1 | 0.4 | 21.0 | — | — | — | 0.5 | 0.5 | — | — | 0.6 | 18.8 | ○ | ○ |
| 4 | 0.1 | 0.6 | 5.0 | 4.2 | 23.5 | 1.5 | — | 1.2 | 1.2 | 0.7 | 25.9 | 11.0 | ○ | ○ |
| 5 | 0.2 | 0.4 | 7.8 | 8.0 | 18.1 | — | 0.3 | 0.4 | — | — | 18.7 | 19.8 | ○ | ○ |
| 6 | 0.2 | 0.5 | 2.4 | 4.2 | 13.8 | 0.5 | — | — | — | — | 15.1 | 11.0 | X | X |
| 7 | 0.4 | 0.3 | 3.5 | 4.2 | 1.2 | 0.5 | — | — | — | — | 2.0 | 15.8 | X | X |

(Note 1) Nos. 1–5 are working examples, and Nos. 6 and 7 are comparative examples.
(Note 2) Filler metal No. 5 has the same chemical composition as filler metal No. 23 in Table 3. Filler metal No. 7 has the same chemical composition as filler metal No. 3 in Table 3.

Welding current: 120A (normally 100–150A)
Welding voltage: 10–12V (due to fluctuation)
Welding speed: 7 cm/min (normally 5–10 cm/min)
Shielding gas: argon
Filler metal: wire 1.2 mm in diameter After welding, the weld zone was examined for defects by X-ray test and sectional surface inspection. The results are shown in Table 26.

Figure 5:
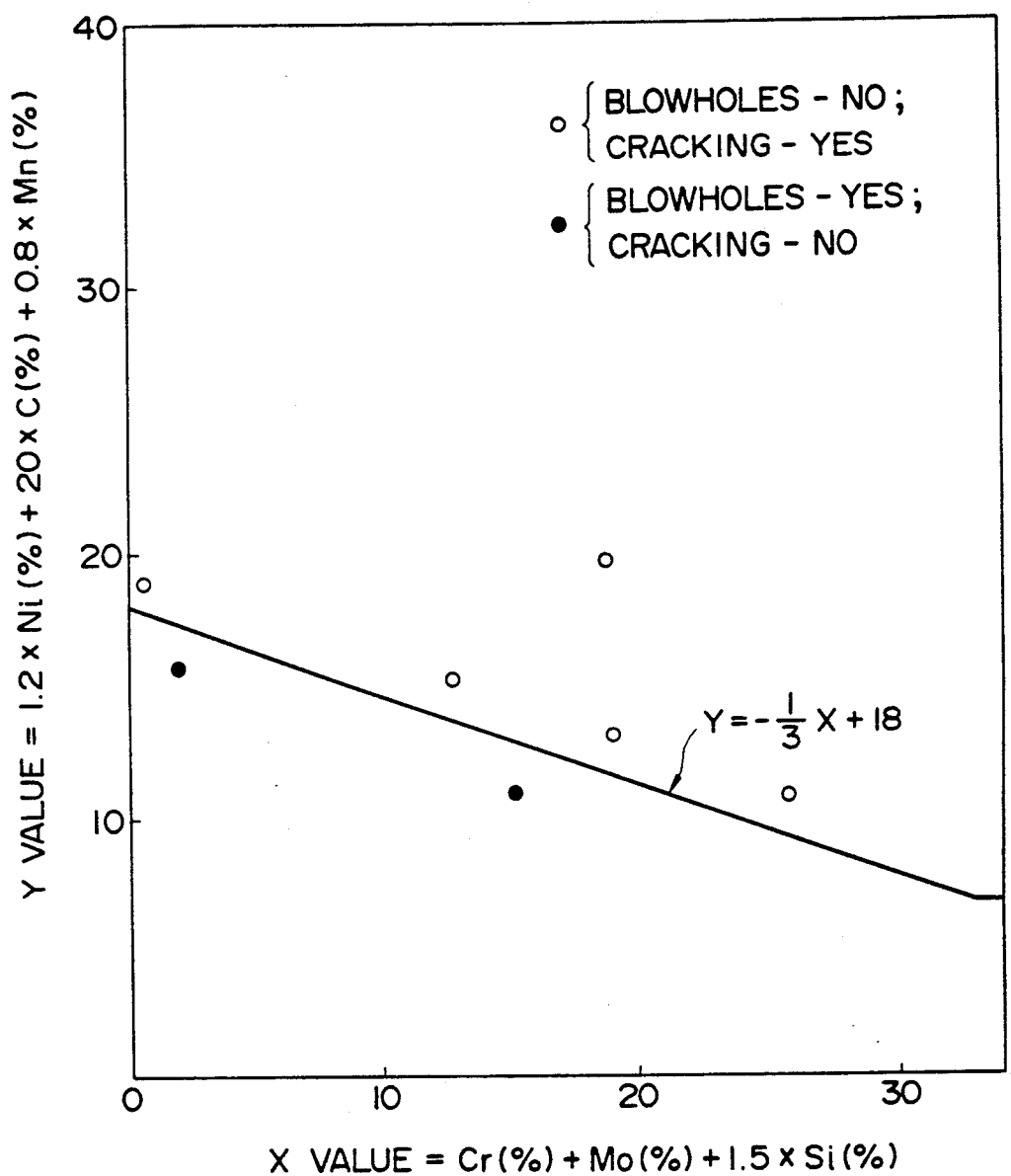
FIG. 5 is a graphical representation showing the relationship between the chemical composition (Y component and X component) of the filler metal for arc welding and the presence or absence of defects (such as cold cracking and blowholes).

The test results are summarized in FIG. 5, which shows the relationship between the chemical composition of the filler metal and the defects of the weld zone. It is noted from FIG. 5 that the weld zone is free of blowholes and cold cracking if the filler metal has the specific composition defined by $Y \geq -(\frac{1}{3})X + 18$ and $Y \geq 7$ and also contains at least one selected from the group consisting of Al, Ti, Zr, and V in a total amount of 0.2–5%.

As mentioned above, the present invention provides a filler metal which gives rise to a sound weld zone unattainable with conventional filler metals in the welding of a part of porous sintered material to a part of the same material or steel. Especially, the filler metal permits high energy density beam welding. Therefore, the present invention contributes to the reliable and highly productive welding.

What is claimed is:

1. A filler metal to be used for welding a part of porous sintered material to a part of the same material or steel, wherein said filler metal is in the form of cored wire composed of a stainless steel sheath and metal powder enclosed therein, and said metal powder contains (based on the total weight of the wire) 5-30% Mn and at least one selected from the group consisting of Al and Ti in a total amount of 0.2-3%.

2. A filler metal in the form of cored wire as defined in claim 1, wherein the sheath is made of austenite stainless steel and the metal powder enclosed in the sheath contains (based on the total weight of the wire) 0.05-1% C, 5-30% Mn, and at least one selected from the group consisting of Al and Ti in a total amount of 0.2-3%, with the balance being Fe and inevitable impurities.

3. A cored wire, comprising a stainless steel sheath and a filler metal powder comprising 5-30% Mn, 7-15% Ni and at least member selected from the group consisting of Al and Ti in a total amount of 0.2-3%, based on the total weight of the wire, the balance being Fe and inevitable impurities.

4. The cored wire of claim 3, wherein said stainless steel sheath is austenite stainless steel, and said filler metal powder further contains 0.05-1% C.

* * * * *